United States Patent
Itou (10) Patent No.: US 11,287,845 B2
(45) Date of Patent: Mar. 29, 2022

(54) DISPLAY APPARATUS

(71) Applicant: NTT DOCOMO, INC., Tokyo (JP)

(72) Inventor: Takurou Itou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/469,422

(22) PCT Filed: Nov. 30, 2017

(86) PCT No.: PCT/JP2017/042962
§ 371 (c)(1),
(2) Date: Jun. 13, 2019

(87) PCT Pub. No.: WO2019/069474
PCT Pub. Date: Apr. 11, 2019

(65) Prior Publication Data
US 2021/0240223 A1    Aug. 5, 2021

(51) Int. Cl.
*G09G 5/00*    (2006.01)
*G06F 1/16*    (2006.01)

(52) U.S. Cl.
CPC .......... *G06F 1/1618* (2013.01); *G06F 1/1677* (2013.01)

(58) Field of Classification Search
CPC .... G06F 1/1618; G06F 1/1677; G06F 1/1641; G06F 3/0487
See application file for complete search history.

(56) References Cited

U.S. PATENT DOCUMENTS

| | | | |
|---|---|---|---|
| 10,534,531 B2 * | 1/2020 | Seo | G06F 3/04845 |
| 2003/0231143 A1 | 12/2003 | Nakamura et al. | |
| 2010/0079355 A1 | 4/2010 | Kilpatrick, II et al. | |
| 2011/0018821 A1 * | 1/2011 | Kii | G06F 1/1616 345/173 |

(Continued)

FOREIGN PATENT DOCUMENTS

| | | |
|---|---|---|
| JP | 2003-316563 A | 11/2003 |
| JP | 2012-502321 A | 1/2012 |

OTHER PUBLICATIONS

Notice of Reasons for Refusal issued in corresponding Japanese Patent Application No. 2017-194622 dated Nov. 29, 2018, 6 pages.

(Continued)

*Primary Examiner* — Joe H Cheng
(74) *Attorney, Agent, or Firm* — MKG, LLC (57) ABSTRACT

Provided is a foldable display apparatus that reduces inconvenience of an operation. Smartphone is a display apparatus including two screens respectively held by two casings that are connected rotatably about an axis. When an app is selected by selection unit in response to an operation for instructing startup of the app being performed by a user on operation unit, execution unit executes the app. Display control unit determines on which of the two screens an image of the app executed by execution unit is to be displayed based on an opening degree of the two casings detected by opening degree detecting unit and inclinations of the two casings relative to a vertical direction detected by inclination detecting unit, according to data stored in storage unit. Display unit displays the image of the app on either or both of the two screens in accordance with the determination of display control unit.

14 Claims, 4 Drawing Sheets

| App | Style | Display mode | Orientation |
|---|---|---|---|
| Video player app | Fully open style | Full screen mode | Automatic rotation |
| | Notebook PC style | Single screen mode | Horizontal orientation |
| | Tent style | Clone mode | Horizontal orientation |
| | Vertically placed style | Clone mode | Vertical orientation |
| Phone app | Fully open style | Single screen mode | Automatic rotation |
| | Notebook PC style | Single screen mode | Horizontal orientation |
| | Tent style | Single screen mode | Horizontal orientation |
| | Vertically placed style | Single screen mode | Vertical orientation |
| ⋮ | ⋮ | ⋮ | ⋮ |

(56) References Cited

U.S. PATENT DOCUMENTS

| | | | | |
|---|---|---|---|---|
| 2011/0193805 A1* | 8/2011 | Park | ..................... | G06F 1/1692 |
| | | | | 345/173 |
| 2012/0081323 A1* | 4/2012 | Sirpal | ................... | G06F 3/0483 |
| | | | | 345/173 |
| 2012/0229374 A1* | 9/2012 | Kobayashi | ............ | G06F 3/1423 |
| | | | | 345/156 |
| 2012/0250241 A1* | 10/2012 | Minemura | ............ | G06F 1/1616 |
| | | | | 361/679.21 |
| 2016/0132074 A1* | 5/2016 | Kim | ..................... | G06F 1/1652 |
| | | | | 715/769 |
| 2018/0061374 A1* | 3/2018 | Wygonik | .............. | G06F 3/0481 |
| 2020/0233562 A1* | 7/2020 | Itou | .................... | G06F 3/04842 |
| 2020/0264666 A1* | 8/2020 | Itou | ....................... | G06F 3/0487 |
| 2020/0264825 A1* | 8/2020 | Itou | ....................... | G06F 3/1423 |

OTHER PUBLICATIONS

International Search Report issued in corresponding PCT Application No. PCT/JP2018/042962 dated Jan. 16, 2018, 3 pages.
European Search Report issued in corresponding EP Application No. 17927926.0-1221/3540583 dated Dec. 18, 2019, 8 pages.
Communication issued in corresponding EP Application No. 17927926.0 dated Oct. 19, 2021, 6 pages.

* cited by examiner

| Style | Opening degree | Inclination |
|---|---|---|
| Fully open style | 180 degrees | No conditions |
| Fully closed style | 0 degrees | No conditions |
| Notebook PC style | 220 to 260 degrees | A1: 0 to 10 degrees relative to vertically upward<br>A2: ±10 degrees relative to horizontal direction |
| Tent style | 50 to 70 degrees | A1: +20 to +40 degrees relative to horizontal direction<br>A2: ±10 degrees relative to horizontal direction |
| Vertically placed style | 45 to 135 degrees | A1: ±10 degrees relative to horizontal direction<br>A2: 0 to 10 degrees relative to vertical direction |

FIG. 5

| App | Style | Display mode | Orientation |
|---|---|---|---|
| Video player app | Fully open style | Full screen mode | Automatic rotation |
| | Notebook PC style | Single screen mode | Horizontal orientation |
| | Tent style | Clone mode | Horizontal orientation |
| | Vertically placed style | Clone mode | Vertical orientation |
| Phone app | Fully open style | Single screen mode | Automatic rotation |
| | Notebook PC style | Single screen mode | Horizontal orientation |
| | Tent style | Single screen mode | Horizontal orientation |
| | Vertically placed style | Single screen mode | Vertical orientation |
| ⋮ | ⋮ | ⋮ | ⋮ |

DISPLAY APPARATUS

This application is a national stage of PCT/JP2017/042962, filed on Nov. 30, 2017, which claims priority to Japanese Application No. JP 2017-194622, filed on Oct. 4, 2017, the content of which in its entirety is herein incorporated by reference.

TECHNICAL FIELD

The present invention relates to user interface technology.

BACKGROUND ART

Technology is proposed to improve operability when starting up a plurality of applications in an information terminal that includes a plurality of displays. For example, JP 2003-316563 A proposes an information terminal that includes a plurality of display devices housed such that the display devices can be unfolded, and every time the display devices are unfolded, determines an application to be executed with reference to a table in which the order of priority is set.

SUMMARY OF INVENTION

A foldable display apparatus that includes two screens may be used in a display mode in which images of applications are displayed on the two screens and a display mode in which images of applications are displayed on only one of the screens. If images of applications that the user wants to display on the two screens are displayed on only one of the screens, the user needs to perform an operation for changing the display mode of the images. Similarly, if images of applications that the user wants to display on only one of the screens are displayed on the two screens, the user needs to perform an operation for changing the display mode of the images.

It is an object of embodiments of the present invention to provide a foldable display apparatus including two screens that reduces inconvenience of an operation for changing the display mode.

One aspect of the present invention provides a display apparatus including a first casing and a second casing that are connected rotatably about an axis, a first screen held by the first casing and a second screen held by the second casing, an execution unit that executes processing in accordance with an application that is selected from among a plurality of applications, and a display control unit that displays an image created in the processing in accordance with the application executed by the execution unit on one or two screens selected from the first screen and the second screen according to the application.

A configuration may be employed in which the display apparatus further includes an opening degree detecting unit that detects an opening degree of the first casing and the second casing that changes along with rotation about the axis, wherein the display control unit displays the image created in the processing in accordance with the application executed by the execution unit on one or two screens selected from the first screen and the second screen according to a combination of the application and the opening degree detected by the opening degree detecting unit.

A configuration may be employed in which the display apparatus further includes an inclination detecting unit that detects inclinations of the first casing and the second casing relative to a vertical direction, wherein the display control unit displays the image created in the processing in accordance with the application executed by the execution unit on one or two screens selected from the first screen and the second screen according to a combination of the application, the opening degree detected by the opening degree detecting unit, and the inclinations detected by the inclination detecting unit.

A configuration may be employed in which the display control unit of the display apparatus displays the image created in the processing in accordance with the application executed by the execution unit on one or two screens selected from the first screen and the second screen in an orientation corresponding to the application.

A configuration may be employed in which, in a case where the image created in the processing in accordance with the application executed by the execution unit is displayed on both the first screen and the second screen, the display control unit of the display apparatus determines, according to the application, whether the image is displayed on the first screen and the second screen that are regarded as a single screen, or the entirety of the image is displayed on each of the first screen and the second screen.

According to embodiments of the present invention, the user of the foldable display apparatus including the two screens is relieved from inconvenience of an operation for changing the display mode.

DETAILED DESCRIPTION

1. Embodiment

Figure 1:
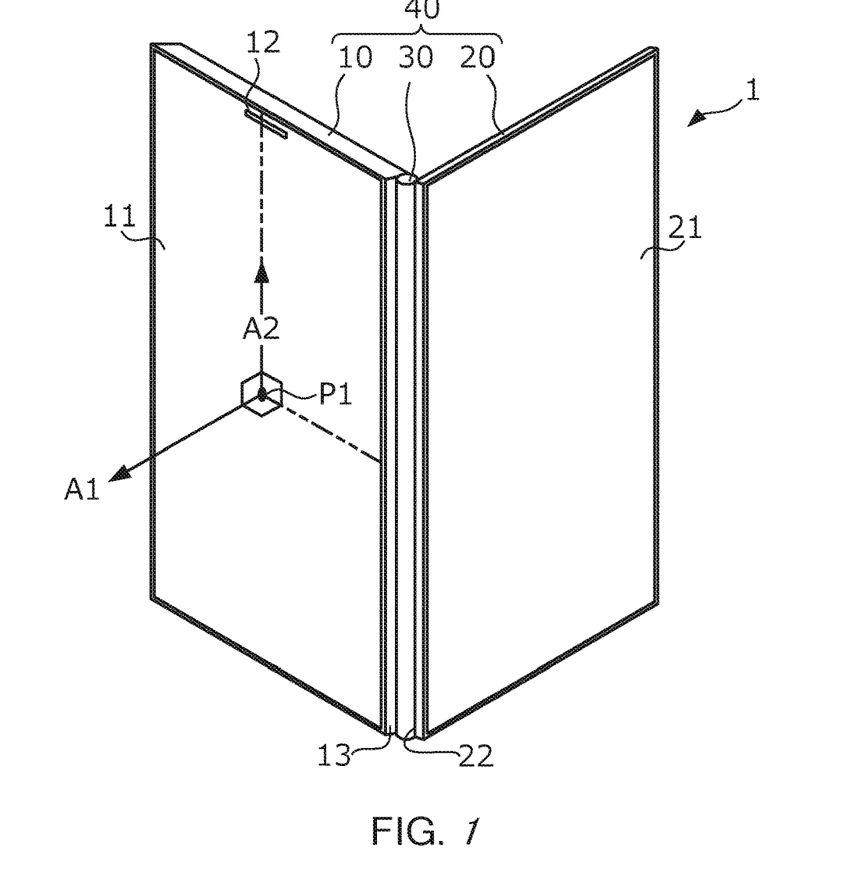
FIG. 1 is a diagram illustrating an appearance of a smartphone according to an embodiment.

FIG. 1 illustrates an appearance of smartphone 1 according to an embodiment. Smartphone 1 has main body 40 that includes first casing 10, second casing 20, and hinge 30. Each of first casing 10 and second casing 20 is a casing that has the shape of a rectangular parallelepiped plate. First casing 10 holds rectangular first screen 11 and second casing 20 holds rectangular second screen 21.

First screen 11 includes speaker port 12 from which the voice on the telephone is output. First screen 11 and second screen 21 are physically separated from each other. First casing 10 and first screen 11 are respectively examples of a "first casing" and a "first screen" in the present invention, and second casing 20 and second screen 21 are respectively examples of a "second casing" and a "second screen" in the present invention. Note that the terms "first" and "second" are used for convenience, and the correspondence described above should not be taken as a limitation. For example, a casing that is provided with speaker port 12 may be an example of the "second casing" in the present invention.

Hinge 30 is a connect that connects first casing 10 and second casing 20 rotatably about an axis. Hinge 30 includes a first rotary member and a second rotary member that are rotatable about the rotation axis. End portion 13 of first casing 10 along a long side of first screen 11 is fixed to the first rotary member, and end portion 22 of second casing 20 along a long side of second screen 21 is fixed to the second rotary member.

As a result of rotation of hinge 30, first casing 10 and second casing 20 rotate from a closed state where an angle (hereinafter referred to as a "hinge angle") between first screen 11 and second screen 21 is 0 degrees to an opposite closed state where the hinge angle is 360 degrees, passing through an open state where the hinge angle is 180 degrees. Smartphone 1 is configured such that first screen 11 and second screen 21 face outward in the state where the casings are closed with a hinge angle of 0 degrees, and first screen 11 and second screen 21 face inward in the state where the casings are oppositely closed with a hinge angle of 360 degrees.

Since each of first casing 10 and second casing 20 is plate-shaped, the hinge angle is equivalent to an angle between first casing 10 and second casing 20. The hinge angle is a value that indicates an opening degree of main body 40, that is, an opening degree of first casing 10 and second casing 20. When the hinge angle is changed from 180 degrees to 0 degrees or 360 degrees, first casing 10 and second casing 20 are folded. As described above, hinge 30 connects first casing 10 and second casing 20 in a foldable manner. Hinge 30 is an example of a "connecting means" in the present invention.

Figure 2:
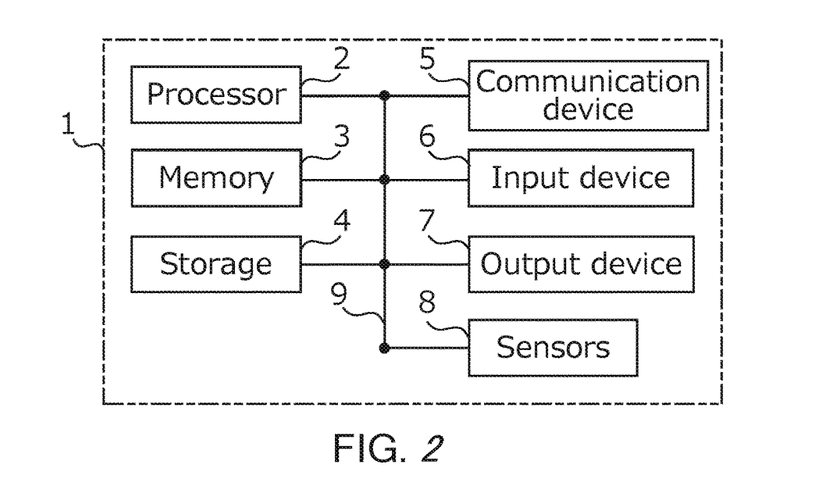
FIG. 2 is a diagram illustrating a hardware configuration of the smartphone according to the embodiment.

FIG. 2 illustrates a hardware configuration of smartphone 1. Smartphone 1 is a computer that includes processor 2, memory 3, storage 4, communication apparatus 5, input apparatus 6, output apparatus 7, sensor group 8, and bus 9 as hardware pieces. Most of these hardware pieces are housed inside main body 40, but there are some hardware pieces that are exposed to the outside, such as the screens. Note that the term "hardware" used here means physical constituent elements and widely encompasses circuits, devices, units, and the like.

Processor 2 controls the entirety of the computer by operating an operating system (hereinafter referred to as an "OS"), for example. Processor 2 may be constituted by a central processing unit (CPU) that includes an interface with peripheral apparatuses, a control apparatus, an arithmetic apparatus, and a register, for example. Also, processor 2 reads out programs (program codes) that include the OS and various applications (hereinafter also simply referred to as "apps"), software modules, data, and the like from storage 4 and/or communication apparatus 5 to memory 3 and executes various types of processing in accordance therewith.

The type of processor 2 may be any of a microprocessor, a digital signal processor (DSP), an application specific integrated circuit (ASIC), a programmable logic device (PLD), and a field programmable gate array (FPGA), for example.

Processor 2 executes, as applications, a browser, a social networking service (SNS) app, an email app, a telephone app, a telephone directory app, a map app, a moving picture reproduction app, a book browsing app, a document creation app, and a camera app, for example. The number of processors 2 may be one or two or more, and two or more processors 2 may execute various types of processing simultaneously or sequentially. Also, processor 2 may be mounted on one or more chips. Programs may be transmitted from a network via a telecommunication line.

Memory 3 is a computer readable recording medium and may be constituted by at least one of a read only memory (ROM), an erasable programmable ROM (EPROM), an electrically erasable programmable ROM (EEPROM), and a random access memory (RAM), for example. Memory 3 may be any of apparatuses called a register, a cache, a main memory (main storage apparatus), and the like. Memory 3 is capable of storing the above-described programs (program codes), software modules, data, and the like. Memory 3 may also be called a main storage apparatus.

Storage 4 is a computer readable recording medium and may be any of a hard disk drive, a flexible disk, a flash memory (for example, a card, a stick, or a key drive), and a magnetic strip, for example. Storage 4 may also be called an auxiliary storage apparatus.

Communication apparatus 5 is hardware for performing enter-computer communication via a cable network and/or a wireless network and may also be called a network device, a network controller, a network card, or a communication module, for example. Input apparatus 6 is an input device that receives input from the outside, examples of which include a microphone, a switch, a button, and a touch sensor. Output apparatus 7 is an output device that realizes output to the outside, examples of which include a display, a speaker, and an LED lamp. Note that smartphone 1 includes a touch screen that is constituted by a touch sensor, which is a part of input apparatus 6, and a display, which is a part of output apparatus 7.

Sensor group 8 is a group of various sensors. Sensor group 8 includes, for example, a strain sensor that is provided on hinge 30 as a sensor for detecting the opening degree of first casing 10 and second casing 20.

Sensor group 8 also includes, for example, a three-axis acceleration sensor as a sensor for detecting inclinations of first casing 10 and second casing 20 relative to a vertical direction. An inclination of first casing 10 is identified using angles of two reference directions relative to the vertical direction, and an inclination of second casing 20 is identified using the inclination of first casing 10 and the opening degree of first casing 10 and second casing 20 identified using the strain sensor.

The two reference directions used for identifying the inclination of first casing 10 are, for example, the direction (hereinafter referred to as "reference direction A1") of a normal line extending from center point P1 of first screen 11 illustrated in FIG. 1 and the direction (hereinafter referred to as "reference direction A2") from center point P1 toward speaker port 12 along the long side of first screen 11.

The apparatuses such as processor 2 and memory 3 included in the computer transmit and receive data via bus 9. Bus 9 may be constituted by a single bus or a plurality of buses that individually connect predetermined apparatuses.

Smartphone 1 is used in a plurality of forms corresponding to combinations of the opening degree of first casing 10 and second casing 20 and inclinations of first casing 10 and second casing 20 relative to the vertical direction. These forms are referred to below as "styles".

Figure 3:
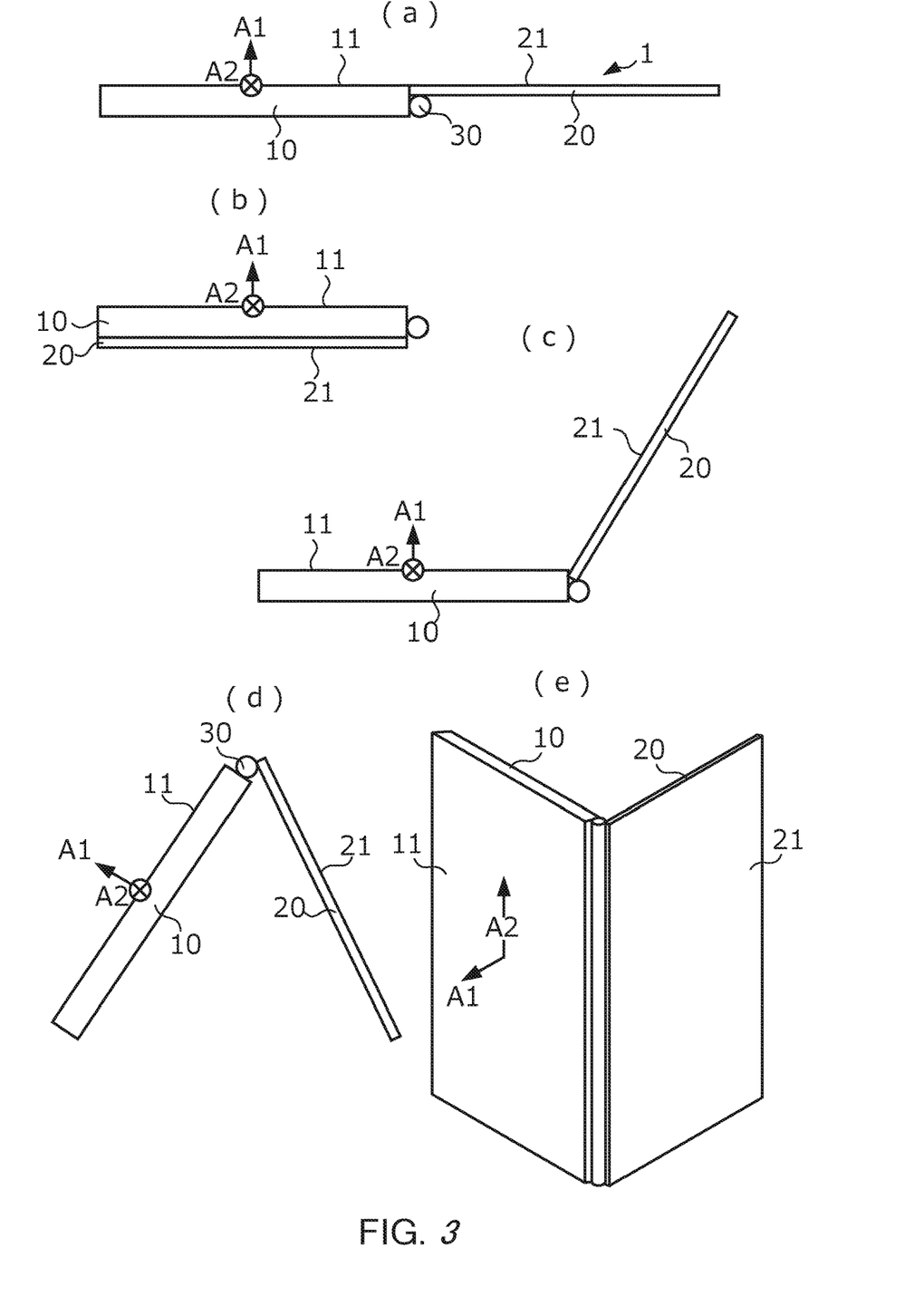
FIG. 3 are diagrams illustrating examples of styles of the smartphone according to the embodiment.

FIG. 3 illustrate examples of styles of smartphone 1. FIGS. 3(*a*) to 3(*d*) illustrate smartphone 1 as viewed from the longitudinal direction of hinge 30. A style in which the opening degree of main body 40 (i.e., hinge angle) is 180 degrees as illustrated in FIG. 3(*a*) will be referred to as a "fully open style". Whenever the opening degree of main body 40 is 180 degrees, the style is the fully open style irrespective of the inclination of main body 40.

A style in which the opening degree of main body 40 is 0 degrees as illustrated in FIG. 3(b) will be referred to as a "fully closed style". Similarly, whenever this condition is satisfied, the style is the fully closed style irrespective of the inclination of main body 40. A style in which the opening degree of main body 40 is about 240 degrees (for example, 240 degrees±20 degrees), reference direction A1 is oriented approximately vertically upward (for example, at an angle of 0 degrees±10 degrees relative to the vertical direction), and reference direction A2 is oriented approximately in the horizontal direction (for example, at an angle of 0 degrees±10 degrees relative to the horizontal direction) as illustrated in FIG. 3(c) will be referred to as a "notebook PC style" for similarity to the shape of a notebook personal computer (PC) when in use.

A style in which the opening degree of main body 40 is about 60 degrees (for example, 60 degrees±10 degrees), reference direction A1 is oriented at an angle of about 30 degrees vertically upward relative to the horizontal direction (for example, at an angle of 30 degrees±10 degrees relative to the vertical direction), and reference direction A2 is oriented approximately in the horizontal direction (for example, at an angle of 0 degrees±10 degrees relative to the horizontal direction) as illustrated in FIG. 3(d) will be referred to as a "tent style" for similarity to the shape of a tent.

FIG. 3(e) illustrates smartphone 1 as viewed from diagonally above. A style in which the opening degree of main body 40 is about 90 degrees (for example, falls in a range of 90 degrees±45 degrees), reference direction A1 is oriented approximately in the horizontal direction (for example, at an angle of 0 degrees±10 degrees relative to the horizontal direction), and reference direction A2 is oriented approximately vertically upward or vertically downward (for example, at an angle of 0 degrees±10 degrees or 180 degrees±10 degrees relative to the vertical direction) as illustrated in FIG. 3(e) will be referred to as a "vertically placed style".

Figure 4:
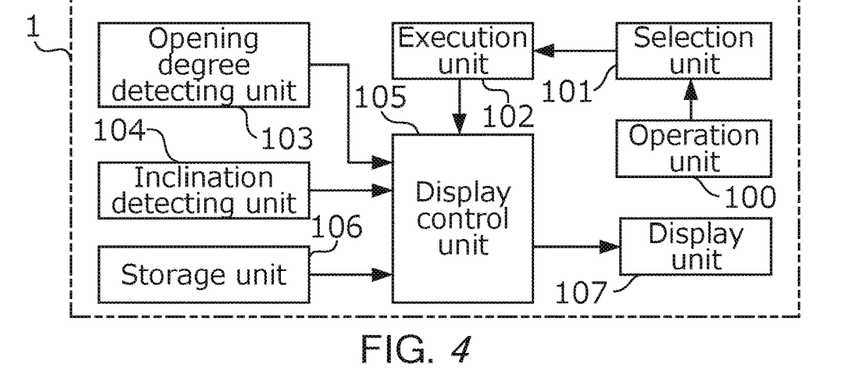
FIG. 4 is a diagram illustrating a functional configuration of the smartphone according to the embodiment.

FIG. 4 illustrates a functional configuration of smartphone 1. That is, functional constituent units illustrated in FIG. 4 are realized as a result of processor 2 of smartphone 1 executing programs and controlling respective units. The following describes functional constituent units of smartphone 1.

Operation unit 100 accepts operations performed by the user. Operation unit 100 is realized mainly by input apparatus 6, the strain sensor and the acceleration sensor included in sensor group 8, and processor 2. Examples of operations that operation unit 100 accepts include a touch operation made on a touch display for selecting an app, an operation for changing the opening degree of first casing 10 and second casing 20, and an operation for changing the inclination of main body 40.

In response to an operation performed by the user on operation unit 100, selection unit 101 selects, from among a plurality of apps that can be executed by execution unit 102, a target app of which an image is to be displayed on at least one of first screen 11 and second screen 21. Selection unit 101 is realized mainly by processor 2.

Execution unit 102 executes processing in accordance with the app selected by selection unit 101. Execution unit 102 is realized mainly by processor 2. Opening degree detecting unit 103 detects the opening degree of first casing 10 and second casing 20 that changes along with rotation of hinge 30 about the rotation axis. Opening degree detecting unit 103 is realized mainly by the strain sensor included in sensor group 8 and processor 2. Inclination detecting unit 104 detects inclinations of first screen 11 and second screen 21. Opening degree detecting unit 103 is realized mainly by the acceleration sensor included in sensor group 8 and processor 2.

Display control unit 105 displays an image that is created in the processing in accordance with the app executed by execution unit 102 (hereinafter referred to as an "image of the app") on one or two screens selected from first screen 11 and second screen 21 according to the app. Display control unit 105 is realized mainly by processor 2.

In the case of a certain app, display control unit 105 displays an image of the app on one or two screens selected from first screen 11 and second screen 21 according to a combination of the app and the opening degree detected by opening degree detecting unit 103. In the case of another app, display control unit 105 displays an image of the app on one or two screens selected from first screen 11 and second screen 21 according to a combination of the app, the opening degree detected by opening degree detecting unit 103, and inclinations detected by inclination detecting unit 104.

Storage unit 106 stores data that display control unit 105 uses to determine the display mode of an image of an app. The data stored in storage unit 106 will be described later. Storage unit 106 is realized mainly by storage 4.

Under control of display control unit 105, display unit 107 displays the image of the app executed by execution unit 102. Display unit 107 is realized mainly by first screen 11 and second screen 21.

Figure 5:
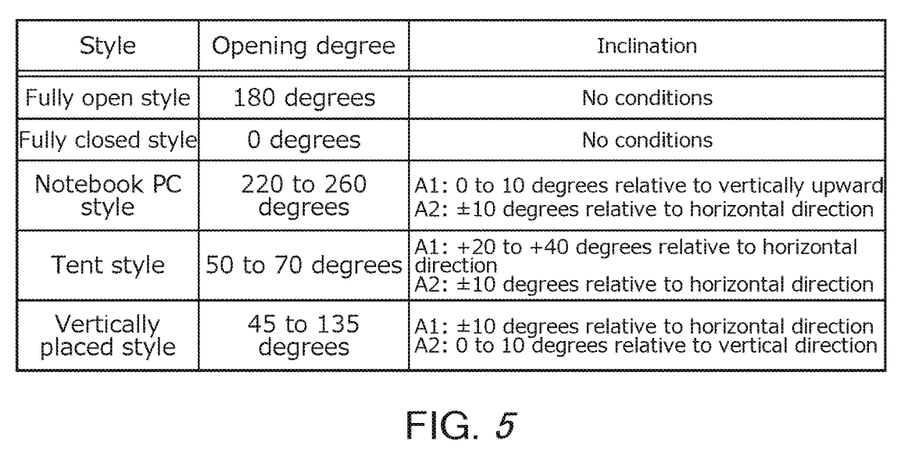
FIG. 5 is a diagram illustrating an example of a style condition table according to the embodiment.

Storage unit 106 stores a style condition table and a display rule table as the data that display control unit 105 uses to determine the display mode of an image of an app. FIG. 5 illustrates an example of the style condition table. Data that indicates conditions for identifying the style of smartphone 1 is stored in the style condition table. For example, data stored in the first row of FIG. 5 indicates that the style of smartphone 1 is identified as being the fully open style under a condition that the opening degree of first casing 10 and second casing 20 (i.e., hinge angle) is 180 degrees, and no conditions need to be satisfied regarding inclinations of first casing 10 and second casing 20 to make this identification.

Figure 6:
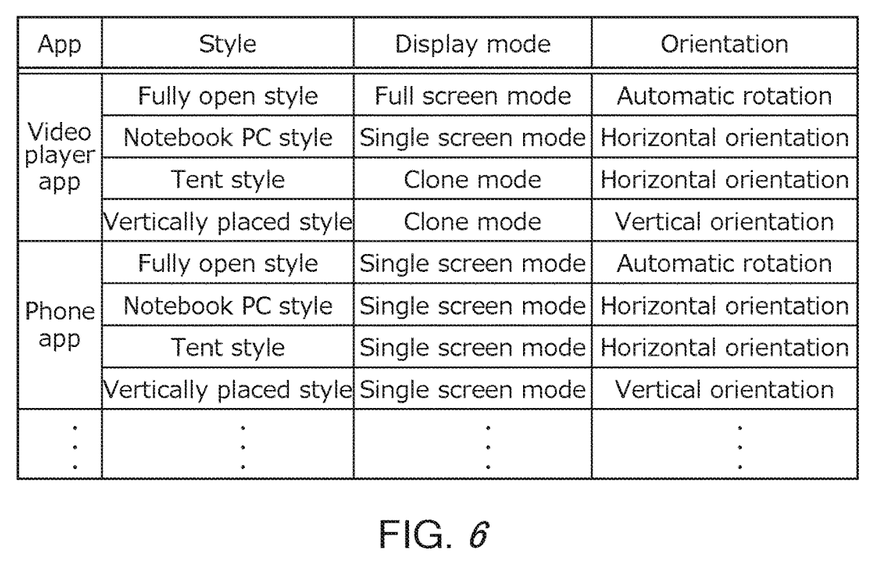
FIG. 6 is a diagram illustrating an example of a display rule table according to the embodiment.

FIG. 6 illustrates a part of an example of the display rule table. Data that indicates rules that smartphone 1 follows to determine the display mode and the orientation of an image of an app when the image is to be displayed is stored in the display rule table.

Display modes include a "full screen mode" in which the image is displayed on first screen 11 and second screen 21, which are regarded as a single screen, a "single screen mode" in which the image is displayed on only one of first screen 11 and second screen 21, and a "clone mode" in which the entirety of the same image is displayed on each of first screen 11 and second screen 21. Orientations of the image include a "vertical orientation" where the longitudinal direction of first screen 11 or second screen 21 is set as the up-down direction, a "horizontal orientation" where the longitudinal direction of first screen 11 or second screen 21 is set as the left-right direction, and "automatic rotation" where the vertical orientation or the horizontal orientation is automatically selected according to inclinations such that the up-down direction of the image approaches the vertical direction.

For example, data stored in the first row of FIG. 6 indicates that a screen of a moving picture reproduction app is displayed in the full screen mode in the fully open style, and the orientation of an image is determined according to inclinations of first screen 11 and second screen 21.

Figure 7:
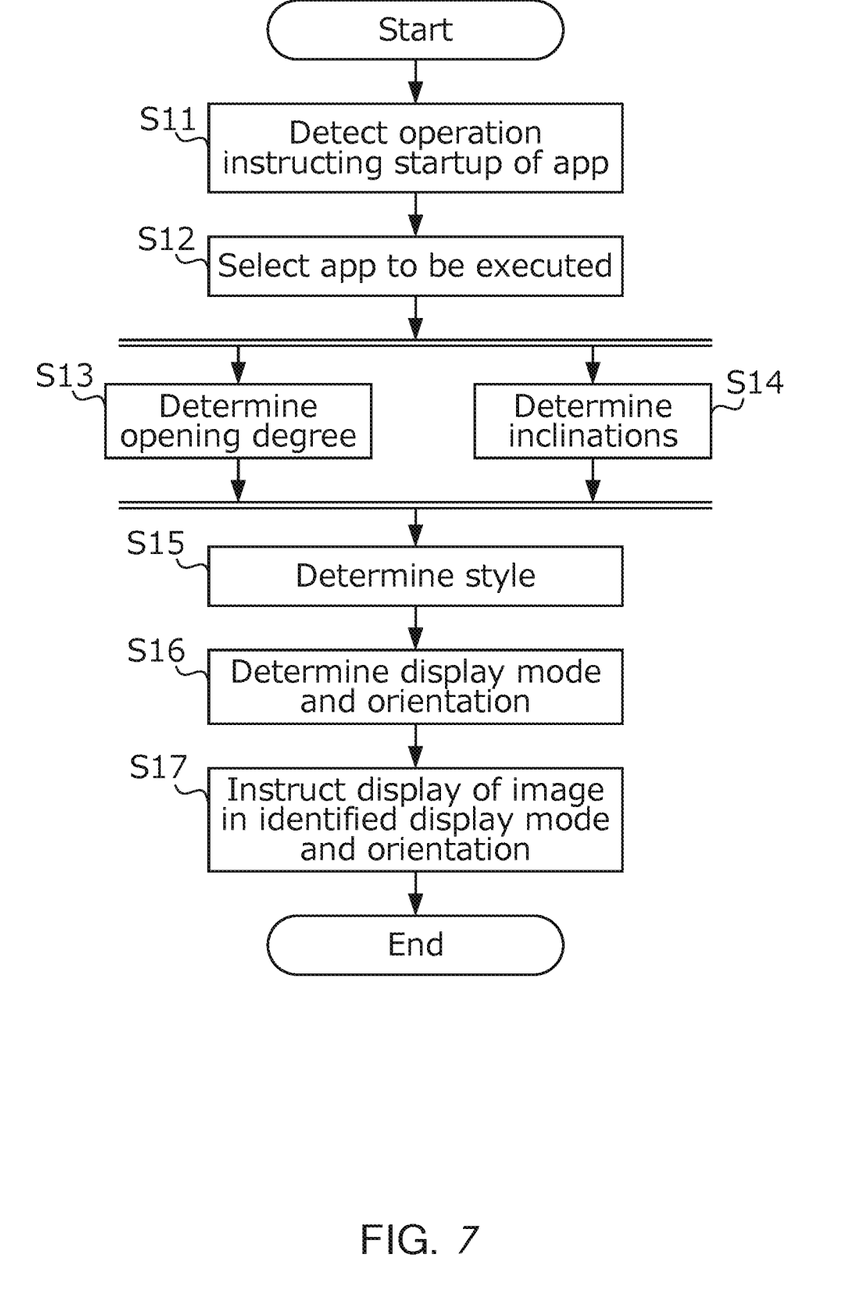
FIG. 7 is a diagram illustrating the flow of processing that the smartphone according to the embodiment performs to display an image of an app.

FIG. 7 is a diagram illustrating the flow of processing that is performed by smartphone 1 having the above-described configuration to display an image of an app (hereinafter referred to as "app X") when the user has performed an operation for instructing smartphone 1 to start up the app X.

First, operation unit 100 detects the operation performed by the user to instruct startup of app X (step S11). Next, in accordance with the instruction from the user indicated by the operation detected by operation unit 100, selection unit 101 selects app X as the app to be executed from among a plurality of apps that can be executed by execution unit 102 (step S12).

Next, opening degree detecting unit 103 detects the opening degree of first casing 10 and second casing 20 (step S13). While step S14 is being performed, inclination detecting unit 104 detects the inclinations of first casing 10 and second casing 20 (step S14).

Next, display control unit 105 identifies the style of smartphone 1 based on the opening degree detected in step S13 and the inclinations detected in step S14 with reference to the style condition table (FIG. 5) stored in storage unit 106 (step S15).

Next, display control unit 105 identifies the display mode and the orientation of an image corresponding to the style identified in step S15 with reference to the display rule table (FIG. 6) stored in storage unit 106, following rules indicated by data corresponding to app X selected in step S12 (step S16).

Next, display control unit 105 instructs display unit 107 to display the image of app X in the display mode and the orientation identified in step S16 (step S17). Then, display unit 107 displays the image of app X executed by execution unit 102 in the display mode and the orientation in accordance with the instruction from display control unit 105.

According to above-described smartphone 1, one or two screens of first screen 11 and second screen 21 is/are selected as the screen(s) to be used for displaying an image of an app, according to the app. Therefore, the user is relieved from inconvenience of selecting the screen(s) to be used according to the app.

Also, according to above-described smartphone 1, in the case of a certain app, one or two screens of first screen 11 and second screen 21 is/are selected as the screen(s) to be used for displaying an image of the app, according to a combination of the app and the opening degree. Therefore, the user is relieved from inconvenience of selecting the screen(s) to be used for the same app according to the opening degree.

Also, according to above-described smartphone 1, in the case of another app, one or two screens of first screen 11 and second screen 21 is/are selected as the screen(s) to be used for displaying an image of the app, according to a combination of the app, the opening degree, and inclinations. Therefore, the user is relieved from inconvenience of selecting the screen(s) to be used for the same app according to a combination of the opening degree and the inclinations.

Also, according to above-described smartphone 1, an image of an app is displayed in the orientation corresponding to the app. Therefore, the user is relieved from inconvenience of selecting the display orientation of the image according to the app.

Also, according to above-described smartphone 1, in a case where an image of an app is displayed on both first screen 11 and second screen 21, whether the image is to be displayed in the full screen mode, in which the image is displayed on first screen 11 and second screen 21 regarded as a single screen, or in the clone mode, in which the entirety of the same image is displayed on each of first screen 11 and second screen 21, is determined according to the app. Therefore, the user is relieved from inconvenience of selecting the full screen mode or the clone mode according to the app.

2. Variations

The above-described embodiment is merely an example of embodiments of the present invention, and the present invention can be carried out with variations. The following describes some of the variations. Note that two or more of the following variations may be combined as appropriate.

2-1. Trigger for Changing Display Mode and Orientation

In the above-described embodiment, detection of the user's operation for instructing execution of an app acts as a trigger for execution of the processing (FIG. 7) by smartphone 1 to determine the display mode and the display orientation of an image of the app. This trigger is not limited to the detection of the user's operation for instructing execution of the app, and various other events may be employed as the trigger.

For example, detection of an operation for instructing display of an image of an app that has already been executed but the image is not displayed, that is, an app that is being executed in the background, may be employed as a trigger for determination of the display mode and the display orientation of the image of the app. Also, detection of an operation for activating an app that has already been executed and is displayed on first screen 11 or second screen 21, but is not active may be employed as a trigger for determination of the display mode and the display orientation of an image of the app.

Also, detection of a change of the style of smartphone 1, which is caused by a change made by the user in at least one of the opening degree of first casing 10 and second casing 20 and inclinations of first casing 10 and second casing 20, may be employed as a trigger for determination of the display mode and the display orientation of an image of an app that is being executed (or an app started up in response to this trigger).

2-2. Modification of Display Rule Table

Data stored in the display rule table may be modified in accordance with an operation performed by the user. For example, a configuration may be employed in which smartphone 1 includes a modification unit as a functional constituent unit, and when the user performs an operation on smartphone 1 to edit contents of the display rule table, the modification unit modifies data of the display rule table stored in storage 106 in accordance with the operation.

Alternatively, a configuration may be employed in which the modification unit modifies the data of the display rule table based on statistics regarding at least one of the display mode and the display orientation that the user has selected in the past according to the app.

For example, according to the example in FIG. 6, when the moving picture reproduction app is started up in the fully open style, an image of the moving picture reproduction app is displayed in the full screen mode and the display orientation of the image is determined by an automatic rotation function. Let us assume that, for example, the following situation successively took place a predetermined number of times or more, that is, after the user started up the moving picture reproduction app, the user changed the display mode from the full screen mode to the single screen mode and performed an operation for changing the display orientation from the automatic rotation to the horizontal orientation.

In such a case, it is presumed that this user often wants to see the screen of the moving picture reproduction app in the single screen mode rather than the full screen mode, and does not like the display orientation of the image being changed according to inclinations of first screen 11 and second screen 21. In this case, the modification unit may accordingly modify the display rule table to indicate that, in the fully open style, an image of the moving picture reproduction app is to be displayed in the single screen mode and in the horizontal orientation.

2-3. Type of Sensor

The sensor for detecting the opening degree of first casing 10 and second casing 20 is not limited to the strain sensor, and other types of sensors such as an electromagnetic coupling-type angle sensor may be employed.

Also, the sensor for detecting inclinations of first casing 10 and second casing 20 is not limited to the acceleration sensor, and other types of sensors such as a gyroscope sensor may be employed.

2-4. Type of Style

Possible styles of smartphone 1 are not limited to those described in the embodiment. For example, as for the fully open style, a style of smartphone 1 laid on the floor (with reference direction A1 oriented vertically upward) and a style of smartphone 1 held in a hand (with reference direction A1 oriented slightly vertically upward from the horizontal direction) may be distinguished as different styles.

Also, as for the fully closed style, a style of smartphone 1 held vertically (with reference direction A2 oriented approximately vertically upward) and a style of smartphone 1 held sideways (with reference direction A2 oriented in the horizontal direction) may be distinguished as different styles.

2-5. Connecting Means

Although hinge 30 of smartphone 1 rotatably connects first casing 10 and second casing 20 such that the hinge angle changes from 0 degrees to 360 degrees, the connecting may be such that the hinge angle changes in any range therebetween. Also, although in the embodiment, hinge 30 connects first casing 10 and second casing 20 such that first screen 11 and second screen 21 face outward when the hinge angle is 0 degrees, conversely, first casing 10 and second casing 20 may be connected such that first screen 11 and second screen 21 face inward when the hinge angle is 0 degrees.

2-6. Category of Invention

The present invention is applicable not only to a smartphone but also to any foldable display apparatus including two screens, which is not required to have a telephone call function. The present invention can be interpreted as an information processing method for realizing processing executed by a display apparatus, or a program that causes a foldable computer including two screens to operate as a display apparatus including the above-described functional constituent units of smartphone 1, as well as a display apparatus. This program may be provided in the form of a recording medium such as an optical disk storing the program, or may be provided as a program that is to be downloaded to a computer via a network such as the Internet and is available when it is installed.

2-7. Processing Procedure and the Like

The processing procedure, sequence, flowchart, and the like of the embodiment described in the present specification may be performed in a different order so long as no contradiction is incurred. For example, elements of various steps of the method described in the present specification are described in an illustrative order, and the described order should not be taken as a specific limitation.

2-8. Handling of Input or Output Information and the Like

Input or output information and the like may be stored in a predetermined location (for example, a memory) or may be managed using a management table. Input or output information and the like can be overwritten or updated, or information may be added thereto. Output information and the like may be deleted. Input information and the like may be transmitted to another apparatus.

2-9. Software

Regardless of whether software is called software, firmware, middleware, microcode, hardware description language, or any other name, it should be widely interpreted to mean instruction, instruction set, code, code segment, program code, program, subprogram, software module, application, software application, software package, routine, subroutine, object, executable file, execution thread, procedure, function, and the like.

Also, software, instructions, and the like may be transmitted or received via a transmission medium. For example, when software is transmitted from a website, a server, or another remote source using cable technology such as a coaxial cable, an optical fiber cable, a twisted-pair wire, or a digital subscriber line (DSL) and/or wireless technology such as infrared rays, radio waves, or microwaves, the cable technology and/or wireless technology are encompassed by the definition of the transmission medium.

2-10. Information and Signal

Information, signal, and the like described in the present specification may be expressed using any of various techniques. For example, data, instruction, command, information, signal, bit, symbol, chip, and the like that may be referred to in the entire description given above may be expressed with voltage, current, electromagnetic waves, magnetic field or magnetic particles, photo field or photons, or any combination of these.

2-11. Meaning of "Based on"

The phrase "based on" used in the present specification does not mean "only based on" unless otherwise stated. In other words, the phrase "based on" can mean both "only based on" and "at least based on".

2-12. "And" and "Or"

In the present specification, when a configuration can be implemented by either "A and B" or "A or B", a configuration described with one of these phrases may be used as a configuration described with another of these phrases. For example, when a configuration is described with the phrase "A and B", the phrase "A and B" may be replaced with the phrase "A or B" so long as the configuration can be implemented without inconsistency with other descriptions being incurred.

2-13. Variations or the Like of Embodiment

Each embodiment described in the present specification may be used alone or in combination, or may be switched in accordance with execution. Also, notification of predetermined information (for example, notification of "X") is not limited to explicit notification, and can be made implicitly (for example, by not giving the notification of the predetermined information).

Although the present invention has been described in detail, it is clear for a person skilled in the art that the present invention is not limited to the embodiment described in the present specification. The present invention can be carried out with modifications and alterations not departing from the gist and scope of the present invention that are defined by the claims. Therefore, the descriptions in the present specification are only illustrative, and do not have any meaning that limit the present invention.

The invention claimed is:

1. A display apparatus comprising:
a first casing and a second casing that are connected rotatably about an axis;
a first screen held by the first casing and a second screen held by the second casing;
an execution unit that executes processing in accordance with a selected application that is selected from among a plurality of applications; and
a display control unit that displays an application image created in the processing in accordance with the selected application executed by the execution unit,
wherein the application image is displayed entirely on only one of the first screen and the second screen based on the selected application and a first opening degree of the first casing and the second casing about the axis, and
wherein the application image is displayed on both of the first screen and the second screen, that function as a single screen, based on the selected application and a second opening degree of the first casing and the second casing about the axis.

2. The display apparatus according to claim 1, wherein the display control unit displays the application image entirely on only one of the first screen and second screen based on the selected application, the first opening degree of the first casing and the second casing about the axis, and an inclination or the first casing and the second casing relative to a vertical direction, and
displays the application image on both of the first screen and the second screen based on the selected application, the second opening degree of the first casing and the second casing about the axis, and the inclination of the first casing and the second casing relative to the vertical direction.

3. The display apparatus according to claim 2, further comprising:
an opening degree detecting unit that detects the first opening degree or the first casing and the second casing about the axis and detects the second opening degree of the first casing and the second casing about the axis, and
an inclination detecting unit that detects the inclination of the first casing and the second casing relative to the vertical direction.

4. The display apparatus according to claim 2, further comprising:
a memory for storing a table that defines:
whether the application image is displayed entirely on only one of the first screen and the second screen based on the selected application, the first opening degree of the first casing and the second casing about the axis, and the inclination of the first casing and the second casing relative to the vertical direction, and
whether the application image is displayed on both of the first screen and the application image is displayed on the second screen that function as a single screen, based on the selected application, the second opening degree of the first casing and the second casing about the axis, and the inclination of the first casing and the second casing relative to the vertical direction.

5. The display apparatus according to claim 1,
wherein the display control unit displays the application image created in the processing on the first screen and the second screen in an orientation based on the selected application.

6. The display apparatus according to claim 1,
wherein the application image is displayed entirely an each of the first screen and the second screen based on the selected application and a third opening degree of the first casing and the second casing about the axis.

7. The display apparatus according to claim 1, further comprising:
a memory for storing a table that defines:
whether the application image is displayed entirely on only one of the first screen and the second screen based on the selected application, the first opening degree of the first casing and the second casing about the axis, and the inclination of the first casing and the second casing relative to the vertical direction, and
whether the application intake is displayed on both of the first screen and the second screen, that function as a single screen, based on the selected application and the second opening degree of the first casing and the second casing about the axis.

8. A method comprising:
executing processing in accordance with a selected application that is selected from among a plurality of applications; and
displaying an application image created in the processing in accordance with the selected application,
wherein the application image is displayed entirety on only one of a first screen and a second screen based on the selected application and a first opening degree of a first casing, and a second casing about an axis,
wherein the first screen being held by the first casing and the second screen being held by the second casing that are connected rotatably about the axis; and wherein the application image is displayed on both of the first screen and the second screen that function as a single screen, based on the selected application and a second opening degree of the first casing and the second casing about the axis.

9. The method according to claim 8, wherein the displaying the application image further comprising:

displaying the application image entirely on at least one of the first screen and the second screen based on the selected application, the first opening degree of the first casing and the second casing about the axis, and an inclination of the first casing, and the second casing relative to a vertical direction, and displays the application image is displayed on both of the first screen and the second screen based on the selected application, the second opening degree of the first casing and the second casing about the axis, and the inclination of the first casing and the second casing relative to the vertical direction.

10. The method according to claim 9, further comprising:

detecting the first opening degree of the first casing and the second casing about the axis, detecting the second opening degree of the first casing and the second casing about the axis, and detecting the inclination of the first casing and the second casing relative to the vertical direction.

11. The method according to claim 9, further comprising:

storing in memory a table, the table defining:

whether the application image is displayed entirely on only one of the first screen and the second screen based on the selected application, the first opening degree of the first casing and the second casing about the axis, and the inclination of the first casing and the second casing relative to the vertical direction; and whether the application image is displayed on both of the first screen and the second screen, that function as a single screen, based on the selected application, the second opening degree of the first casing and the second casing about the axis, and the inclination of the first casing and the second casing relative to the vertical direction.

12. The method according to claim 8, further comprising:

displaying the application image created in the processing on the first screen and the second screen in an orientation based on the selected application.

13. The method according to claim 8, wherein the application image is displayed entirely on each of the first screen and the second screen based on the selected application and a third opening degree of the first casing and the second casing about the axis.

14. The method according to claim 8, further comprising:

storing a table in memory, the table defining, whether the application image is displayed entirely on only one of the first screen and the second screen based on the selected application and the first opening degree of the first casing and the second casing about the axis, and whether the application image is displayed on both of the first screen and the application image is displayed on the second screen, that function as a single screen, based on the selected application and the second opening degree of the first casing and the second casing about the axis.

* * * * *

UNITED STATES PATENT AND TRADEMARK OFFICE
CERTIFICATE OF CORRECTION

| | |
|---|---|
| PATENT NO. | : 11,287,845 B2 |
| APPLICATION NO. | : 16/469422 |
| DATED | : March 29, 2022 |
| INVENTOR(S) | : Takurou Itou |

It is certified that error appears in the above-identified patent and that said Letters Patent is hereby corrected as shown below:

On the Title Page

• Column 1, please add the foreign priority information of Japanese Patent Application No. 2017-194622, dated October 4, 2017;

In the Claims

• Column 11, Lines 63, in Claim 1, replace the word "or" with "of";

• Column 12, Line 7, in Claim 3, replace the word "or" with "of";

• Column 12, Line 26, in Claim 4, please add a "," after the word "screen";

• Column 12, Line 39, in Claim 6, replace the word "an" with "on";

• Column 12, Line 52, in Claim 7, replace the word "intake" with "image";

• Column 12, Line 63, in Claim 8, replace the word "entirety" with "entirely:";

• Column 12, Line 66, in Claim 8, remove the "," after the word "casing";

• Column 13, Line 5, in Claim 8, please add a "," between the words "screen" and "that";

• Column 13, Line 15, in Claim 9, please remove the "," after the word "casing"; and,

• Column 14, Line 21, in Claim 14, replace the "," after the word "define" with a ":".

Signed and Sealed this
Twenty-fourth Day of May, 2022

*Katherine Kelly Vidal*
*Director of the United States Patent and Trademark Office*